(12) United States Patent
Krumpelt et al.

(10) Patent No.: US 7,507,690 B2
(45) Date of Patent: Mar. 24, 2009

(54) AUTOTHERMAL REFORMING CATALYST HAVING PEROVSKITE STRUCTURE

(75) Inventors: Michael Krumpelt, Naperville, IL (US); Di-Jia Liu, Naperville, IL (US)

(73) Assignee: UChicago Argonne, LLC., Chicago, IL (US)

(*) Notice: Subject to any disclaimer, the term of this patent is extended or adjusted under 35 U.S.C. 154(b) by 665 days.

(21) Appl. No.: 10/832,753

(22) Filed: Apr. 27, 2004

(65) Prior Publication Data

US 2004/0204315 A1    Oct. 14, 2004

Related U.S. Application Data

(63) Continuation-in-part of application No. 10/423,461, filed on Apr. 25, 2003, now abandoned.

(60) Provisional application No. 60/376,491, filed on Apr. 30, 2002.

(51) Int. Cl.
  *B01J 23/10*   (2006.01)
  *B01J 23/00*   (2006.01)

(52) U.S. Cl. .............. 502/302; 502/303; 502/304; 502/314; 502/319; 502/326; 502/327

(58) Field of Classification Search .......... 502/300, 502/302–305, 325–332, 335–338, 314, 319
See application file for complete search history.

(56) References Cited

U.S. PATENT DOCUMENTS

| | | | |
|---|---|---|---|
| 4,415,484 A | | 11/1983 | Setzer et al. |
| 4,473,543 A | | 9/1984 | Setzer et al. |
| 4,755,498 A | | 7/1988 | Setzer et al. |
| 4,790,963 A | * | 12/1988 | Attig et al. ................ 554/131 |
| 4,814,107 A | * | 3/1989 | Steinberg ................... 252/512 |
| 5,149,516 A | | 9/1992 | Han et al. |
| 5,268,346 A | | 12/1993 | Ino et al. |
| 5,318,937 A | * | 6/1994 | Jovanovic et al. .......... 502/303 |
| 5,380,692 A | * | 1/1995 | Nakatsuji et al. .......... 502/303 |
| 5,447,705 A | | 9/1995 | Petit et al. |
| 5,622,680 A | * | 4/1997 | Monceaux et al. ....... 423/213.5 |
| 5,929,286 A | | 7/1999 | Krumpelt et al. |
| 6,110,861 A | | 8/2000 | Krumpelt et al. |
| 6,238,816 B1 | * | 5/2001 | Cable et al. .................. 429/17 |
| 6,800,388 B2 | * | 10/2004 | Kaneko et al. ............... 429/19 |
| 2001/0053467 A1 | * | 12/2001 | Kaneko et al. ............... 429/19 |

FOREIGN PATENT DOCUMENTS

WO    WO 01/07359 A1    2/2001

* cited by examiner

*Primary Examiner*—Cam N. Nguyen
(74) *Attorney, Agent, or Firm*—Foley & Lardner LLP

(57) ABSTRACT

The invention addressed two critical issues in fuel processing for fuel cell application, i.e. catalyst cost and operating stability. The existing state-of-the-art fuel reforming catalyst uses Rh and platinum supported over refractory oxide which add significant cost to the fuel cell system. Supported metals agglomerate under elevated temperature during reforming and decrease the catalyst activity. The catalyst is a perovskite oxide or a Ruddlesden-Popper type oxide containing rare-earth elements, catalytically active firs row transition metal elements, and stabilizing elements, such that the catalyst is a single phase in high temperature oxidizing conditions and maintains a primarily perovskite or Ruddlesden-Popper structure under high temperature reducing conditions. The catalyst can also contain alkaline earth dopants, which enhance the catalytic activity of the catalyst, but do not compromise the stability of the perovskite structure.

4 Claims, 8 Drawing Sheets

AUTOTHERMAL REFORMING CATALYST HAVING PEROVSKITE STRUCTURE

CROSS REFERENCE TO RELATED APPLICATIONS

The present application is a continuation-in-part of U.S. patent application Ser. No. 10/423,461, filed Apr. 25, 2003 now abandoned which is based upon U.S. Prov. Pat. Appl. No. 60/376,491, filed Apr. 30, 2002 both of which are hereby incorporated by reference.

GOVERNMENT RIGHTS

The United States Government has rights in this invention pursuant to Contract No. W-31-109-ENG-38 between the U.S. Department of Energy (DOE) and The University of Chicago representing Argonne National Laboratory.

FIELD OF THE INVENTION

This invention relates to an improved autothermal reformer. More specifically this invention relates to an improved autothermal reforming catalyst for the reforming of hydrocarbon fuels. Still more specifically this invention relates to an improved autothermal reforming catalyst for the reforming of diesel fuels.

BACKGROUND

Fuel cell-powered vehicles are being developed by the domestic and foreign automotive industry as a more fuel-efficient and less polluting alternative to the current internal combustion engines. Fuel cells, which produce energy through an electrochemical reaction, operate on hydrogen and oxygen gas. Currently, there is no infrastructure for wide-scale, high-volume production and distribution of hydrogen gas for transportation applications. Furthermore, storing pure hydrogen gas on-board a vehicle is not yet accepted by the general public; and the hydrogen storage methods currently available do not have sufficient capacity. An on-board "fuel processor", which generates hydrogen from the liquid gasoline already used to fuel vehicles, is the most acceptable way to provide hydrogen for a fuel cell-powered vehicle.

Fuel processor technology is based mainly on large-scale industrial reactors that convert hydrocarbons into hydrogen and carbon oxides (synthesis gas) for the production of ammonia, methanol, and other commercially important chemicals or feedstock. These large-scale industrial reactors are operated continuously in a well-controlled, steady state manner. In contrast, fuel cells are often employed in small-scale, intermittent use applications, so the fuel processor for a fuel cell needs to be compact and respond quickly to changes in operating conditions. See U.S. Pat. No. 5,248,566 issued Sep. 28, 1993 to Kumar et al., the disclosure of which is incorporated by reference, for a general discussion of the use of a fuel cell in a vehicle. Autothermal reformers have the advantages of conservation of thermal energy and being compact, an important consideration for small passenger vehicles. Autothermal reformers operate at high temperatures (500-1000° C.) and use steam and air, or an oxygen containing gas, to convert the hydrocarbon fuel into hydrogen-rich gas. Like most other fuel processors, autothermal reformers rely on catalysts to obtain the highest concentrations of hydrogen in the shortest amount of time. To function well, autothermal reforming catalysts must adsorb and dissociate the hydrocarbon molecule and the water molecule. Thus, it is highly desirable to provide a catalyst that is active for the autothermal reforming of liquid fuels, such as diesel fuel via its ability to adsorb and dissociate both water and hydrocarbon molecules. It is also desirable to provide an autothermal reforming catalyst that does not contain expensive or rare precious metals so that fuel cell-powered vehicles can be affordable for the general public.

Passenger and heavy duty vehicles are becoming an attractive application for fuel cell systems. Replacing the internal combustion engine with a fuel cell system is a goal of a Department of Energy program and is an active R&D area for many automotive companies. A related, but different application is an "auxiliary power unit" (APU) for heavy duty and perhaps light duty vehicles. Such APUs would generate electricity with a fuel cell for all the electric auxiliaries of the vehicle which otherwise need to be powered by the engine. Examples include, but are not limited to, the water and fuel pumps, electronic devices and displays, living quarter power supply, and on-board air conditioner. Thus the engine can be shut off in stop-and-go traffic or during overnight parking at truck stops and campgrounds without interrupting the on-board electric power supply.

To operate the fuel cell, the hydrocarbon fuels, such as gasoline and diesel, must be first reformed into a gas mixture containing hydrogen and carbon oxides. Such a mixture is also known as reformate. The reforming process is generally carried out inside of a catalytic reactor, also known as reformer. The catalytic reactions inside of the reformer break down the chemical bonds of the hydrocarbon fuel and form $H_2$, $CO$, $CO_2$, simultaneously. There are several methods of catalytic reforming including partial oxidation (POX), steam reforming (SR), and autothermal reforming (ATR). ATR is generally considered the most efficient reforming process. The chemical reactions occurring in the autothermal reactors are facilitated by a catalyst that typically consist of a small amount of noble metals, such as Rh and Pt, resting on a substrate of alumina or ceria. Since the material costs of the noble metals are usually substantially higher than the other components in the catalyst, the amount of noble metal usage usually dominates the total cost of the catalyst. Therefore, to bring down the total cost of a fuel cell system, it is highly desirable to reduce or eliminate the noble metal usage in the catalytic reformer.

Since heavy duty vehicles operate on diesel fuel, the operators of these vehicles prefer that the APU operate on the same fuel. However, diesel fuel is difficult to convert to a hydrogen-rich gas for the fuel cells. Diesel fuel is a mixture of many different hydrocarbon species including paraffins, olefins, cycloparaffins, mono- and multi-ring aromatic compounds. The aromatic compounds are particularly difficult to reform into a hydrogen-rich reformate. They form carbonaceous deposits (coke) easily through the interaction with the catalyst surface and reduce the catalytic efficiency by blocking the passage between gas phase molecules and the active site. It is therefore desirable to have a catalyst with minimum propensity to form carbon deposits on the surface.

Operating the reformer at a higher reaction temperature will minimize the coke formation over the catalyst surface. However, higher reaction temperature results in catalyst structural change which could also lead to the loss of the catalyst activity. Even at temperatures in the range of 700-800° C., which are typical for ATR reactors, the aforementioned catalyst can loose 50% of their activity over a 1000 hour period. This deactivation is caused by the small noble metal particles consolidating into larger ones, resulting in a decrease of active catalytic surface area, and by some loss of noble metal by evaporation. Furthermore, higher operating temperature could also lead to the deterioration of the catalyst support, such as the reduction of surface area and loss of porosity. The deactivation becomes more severe at higher temperatures.

Another challenge in diesel fuel reforming is sulfur poisoning of the catalyst. There is generally a significantly higher level of sulfur content in heavy hydrocarbon fuels, such as diesel Sulfur interacts with most metallic catalysts by chemically absorbing on the metal surface and blocking the access of reactant to the active sites. It is desirable to have a reforming catalyst that is tolerant to the presence of sulfur in the hydrocarbon fuels.

It has been previously established that certain perovskites function surprisingly well at autothermal reforming catalysts. Perovskite oxides have the general formula $ABO_3$. The A cation is bigger than the B cation in accordance with Goldschmidt's empirical relationship $$0.75 < (r_A + r_O)/\sqrt{2}(r_B + r_O) < 1.0$$

where $r_A$ is the radius of the A cation, $r_B$ is the radius of the B cation, and $r_O$ is the radius of the oxygen anion. The perovskite structure will tolerate partial substitution for both the A and B cations, which allows the properties of the compounds to be modified. There are many perovskite related structures: the Ruddlesden-Popper structure $((AO)-(ABO_3)_n, n=1,2,\ldots)$ is a perovskite layered with a rock salt, the tungsten bronze structure $(A_{0.6}BO_3)$ is a defective perovskite with A-site vacancies, and the Brown-Millerite structure $(A_2B_2O_5)$ is defective perovskite with oxygen vacancies. The perovskite oxides, and the related structures, with La, Y, rare earths, and/or alkaline earths on the A site and transition metals on the B site have in many cases been found to be good electronic and/or good ionic conductors.

More specifically it has been found that mixed oxides of La with Cr or Al of the general formula $LaCrO_3$ or $LaAlO_3$ are stable in both air and in hydrogen-rich gas at elevated temperature. When doped with certain other elements, these perovskites are good catalysts for oxidizing and steam-reforming hydrocarbons. For example, a material of the general composition $LaAl_{0.9}Ni_{0.1}O_3$ was found to yield 12 moles of hydrogen per mole of iso-octane when iso-octane is mixed with a substoichiometric amount of air and some steam and then passed over the catalyst. There are, however, certain disadvantages associated with these catalysts. First of all, it was found that these catalysts produce lower hydrogen yield and poor efficiency during reforming of diesel like fuel as the result of high catalytic light-off temperature and low hydrocarbon conversion. It is also known that Ni containing catalysts are intolerant to the low sulfur content in the fuel and coke is readily formed during the reforming reaction.

It is therefore desirable to have a reforming catalyst that is stable under high operating temperature and provides overall lower costs.

SUMMARY OF THE INVENTION

The cost of the two-phase catalysts containing noble metals may limit the widespread potential use of fuel cell systems. To find less expensive alternatives for catalysts, perovskites and related structures were investigated, in part because some of them have "mixed" conductivity. Mixed conductors can transport oxide ions, which can be important for the partial oxidation of hydrocarbons, and are also electronic conductors. Electronic conductivity is typically found only in metals and may be important for the dehydrogenation of hydrocarbon and water molecules. Surprisingly and unexpectedly, it has been discovered that certain perovskites can autothermally reform hydrocarbons.

This invention relates to a reforming catalyst. More specifically, this invention relates to a catalyst for autothermal reforming of hydrocarbon fuels, such as diesel, to produce a high percentage yield of hydrogen suitable for supplying a fuel cell. In one embodiment, the present invention relates to perovskite-related structures for use in hydrocarbon reformers. More specifically, doping a small amount of Ru or Rh into chromite or aluminite type of perovskites provides an improved catalyst. For example, the catalysts of the present invention can be composed of lanthanum chromite, $LaCrO_3$ or lanthanum aluminite, $LaAlO_3$, perovskite materials with both A-site (La) or B-site (Cr or Al) being partially exchanged with other metal ions. Metal exchange ions are, for example, Sr, Ru or Rh to form various catalyst compounds, such as but not limited to, $La_{1-x}Sr_xCr_{1-y}Ru_yO_3$, $La_{1-x}Sr_xCr_{1-y}Rh_yO_3$, $La_{1-x}Sr_xAl_{1-y}Ru_yO_3$ or $La_{1-x}Sr_xAl_{1-y}Rh_yO_3$, where the preferred value for x is between 0.05 to 0.5 and the preferred value for y is between 0.01 to 0.2. Catalysts in accordance with the principles of the present invention have demonstrated high selectivity of converting diesel-like hydrocarbon to hydrogen and carbon oxides under high fuel feed rate and a relatively low reforming temperature range of 600 to 700° C. The catalysts of the present invention have shown excellent ATR reforming efficiency under a wide range of oxygen-to-carbon ratio ($O_2/C$) and steam-to-carbon ratio ($H_2O/C$), as well as superior steam reforming efficiency when air is absent from the feed. The catalysts have also demonstrated good stability of the catalytic activity under high operating temperature and exhibited little or no carbon formation of the catalyst surface. In another embodiment, the present invention comprises an "auxiliary power unit" (APU) for heavy duty and possible light duty vehicles.

DESCRIPTION OF THE FIGURES

The invention includes certain features and a combination of parts hereinafter fully described, illustrated in the accompanying figures, and particularly pointed out in the appended claims, it being understood that various changes in the details may be made without departing from the spirit, or sacrificing any of the advantages of the present invention.

Figure 7:
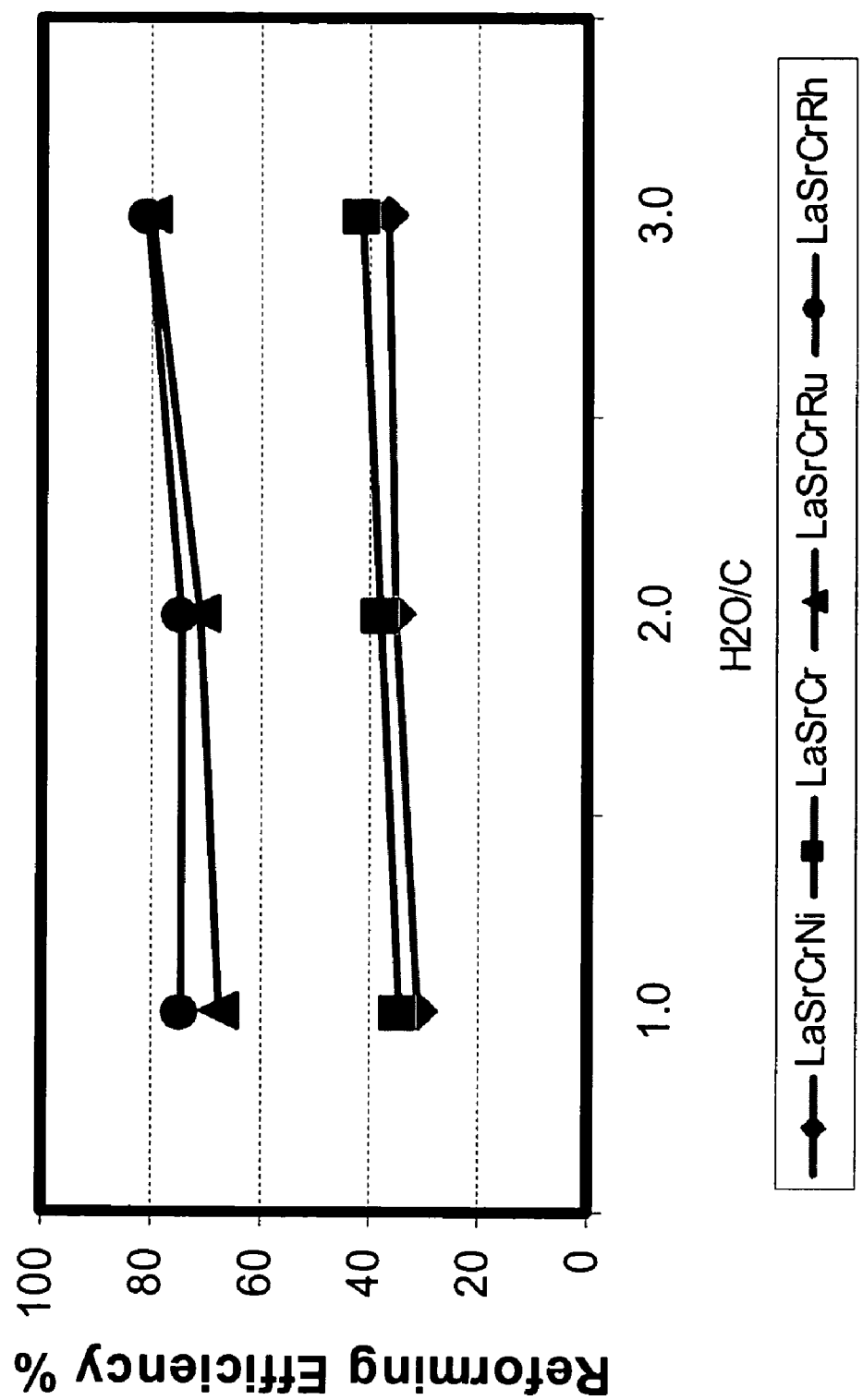
Figure 8:
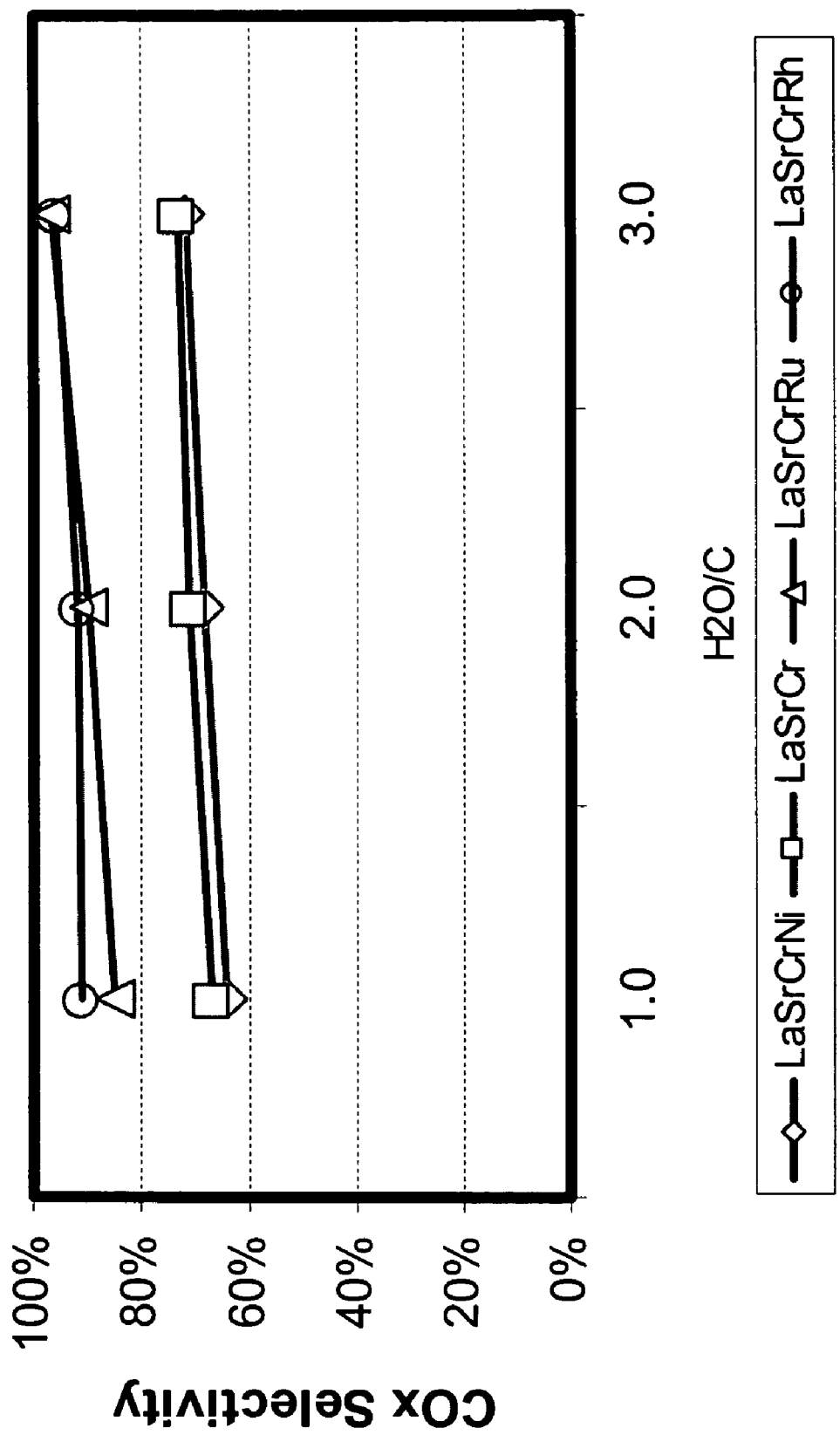

from the current invention with the catalysts $La_{0.8}Sr_{0.2}Cr_{0.9}Ni_{0.1}O_3$ (LaSrCrNi) and $La_{0.8}Sr_{0.2}CrO_3$ (LaSrCr) from the prior art;

FIG. 7 shows the comparison of reforming efficiency at various $H_2O/C$ ($O_2/C=0.5$) of the catalysts $La_{0.8}Sr_{0.2}Cr_{0.95}Ru_{0.05}O_3$ (LaSrCrRu) and $La_{0.8}Sr_{0.2}Cr_{0.95}Rh_{0.05}O_3$ (LaSrCrRh) from the current invention with the catalysts $La_{0.8}Sr_{0.2}Cr_{0.9}Ni_{0.1}O_3$ (LaSrCrNi) and $La_{0.8}Sr_{0.2}CrO_3$ (LaSrCr) from the prior art; and FIG. 8 shows the comparison of COx selectivity at various $H_2O/C$ ($O_2/C=0.5$) of the catalysts $La_{0.8}Sr_{0.2}Cr_{0.95}Ru_{0.05}O_3$ (LaSrCrRu) and $La_{0.8}Sr_{0.2}Cr_{0.95}Rh_{0.05}O_3$ (LaSrCrRh) from the current invention with the catalysts $La_{0.8}Sr_{0.2}Cr_{0.9}Ni_{0.1}O_3$ (LaSrCrNi) and $La_{0.8}Sr_{0.2}CrO_3$ (LaSrCr) from the prior art.

DETAILED DESCRIPTION OF PREFERRED EMBODIMENT

Figure 1:
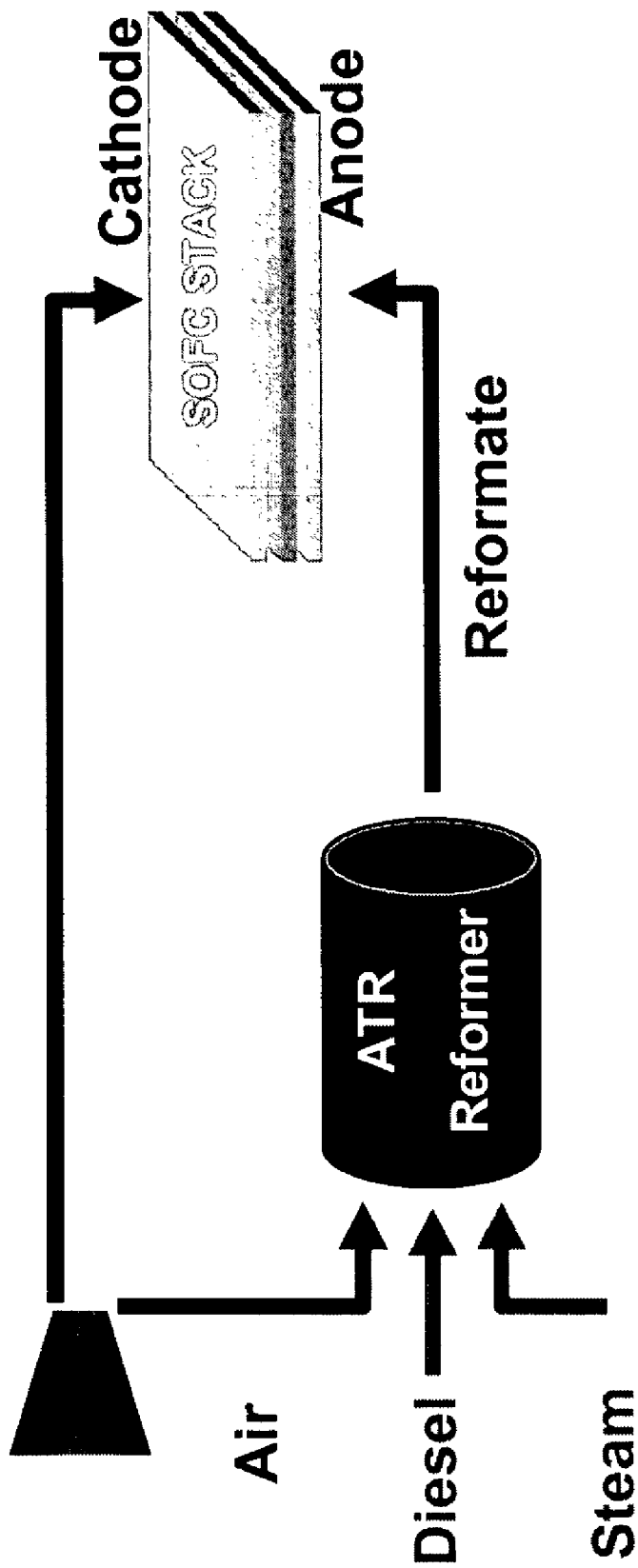
FIG. 1 is a schematic diagram of the general process of diesel reforming for solid oxide fuel cell.

It is desirable to develop a compact fuel processor that produces a high fraction of hydrogen and is self-sustaining. Steam reforming produces a product gas, which has a high fraction of hydrogen and contains mostly hydrogen and carbon monoxide. A major drawback of steam reforming is that it requires heat input (by burning part of the fuel) because it is an endothermic process; and the low rate of heat transfer makes rapid response difficult. Partial oxidation is an exothermic self-sustaining process. However, higher reactor temperatures (>1000° C.) and lower hydrogen to carbon fractions than steam reforming are drawbacks associated with partial oxidation reforming. Autothermal reforming uses heat from partial oxidation to drive endothermic steam reforming in a concurrent process. A proper balance of oxygen (or air), fuel and steam, depending on the composition of the fuel, produces a self-sustaining reaction that yields a high fraction of hydrogen. FIG. 1 shows a schematic diagram of an ATR reformer coupled with a downstream solid oxide fuel cell stack. The compressed air from the pump is mixed with the diesel fuel and the steam before entering the ATR reactor in which the hydrocarbon fuel is converted into hydrogen rich reformate. The reformate was then fed into the anode of the solid oxide fuel cell stack. The electricity is generated through the electrochemical reactions between the oxygen in the cathode and $H_2$/CO in the anode. The exhaust of the fuel cell contains water and carbon dioxide as the product of the electro-oxidation reactions.

A major difficulty for an APU has been to find a catalyst that is active for both steam reforming (SR) and partial oxidation (POX) reactions and is coke resistant. If a catalyst has high activity for POX and low activity for SR, the hydrogen yield will be low. Similarly, if a catalyst has high activity for SR and low activity for POX, heat input will be required to sustain the reaction. The difficulty of converting hydrocarbons such as dodecane (one of the main components in diesel) to hydrogen is the fact that the oxidation of hydrogen formed during the reforming is often more facile than the formation of $H_2$ by breaking down the C—H bond in the hydrocarbons. It has been discovered that certain catalysts can effectively adsorb and dissociate both hydrocarbon molecules and water molecules, and these catalyst compounds facilitate the selective oxidation of the carbon chain using the oxygen from either the water molecule or the oxygen-containing feed gas. Thus, the catalyst in a preferred embodiment is bifunctional.

Figure 2:
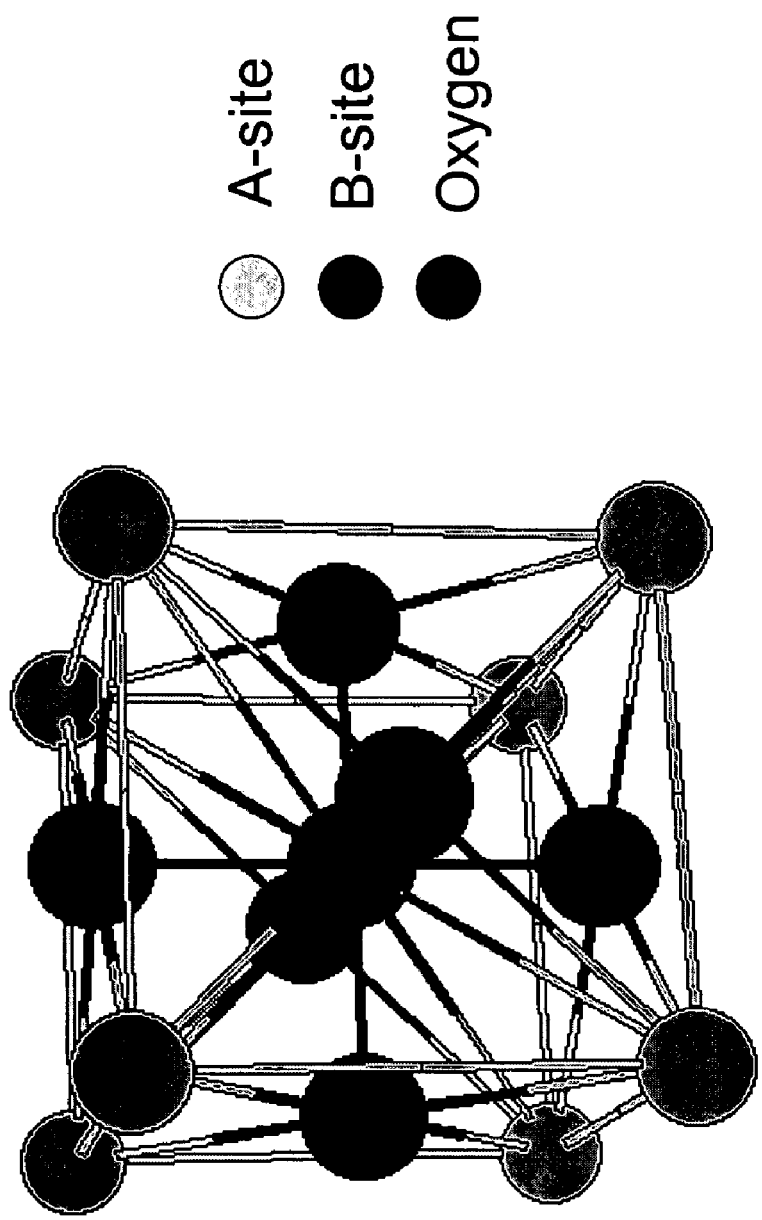
FIG. 2 illustrates the general structure of an unit cell in $ABO_3$ perovskite.

Perovskites are known as excellent electron and oxide ion conductors at elevated temperature. It has been found that certain perovskites exhibit good catalytic activities towards SR and POX reactions. Shown in FIG. 2 is a lattice structure of an unit cell in a perovskite with the chemical composition of $ABO_3$. Simple two-cation rare earth-transition metal perovskites, such as $LnCoO_3$ and $LnNiO_3$, are active catalysts, but are not stable under high temperatures and low oxygen partial pressures like those found in a fuel reformer. X-ray diffraction has shown that they completely break down and do not retain any perovskite structure. Retaining the perovskite structure is desirable because it can be an oxygen ion conductor and supply oxygen to the dehydrogenated hydrocarbon to form carbon monoxide and carbon dioxide and to inhibit the formation of coke. Perovskites such as $LnAlO_3$, $LnCrO_3$, $LnMnO_3$, $LnFeO_3$, and $LaGaO_3$ are not very active catalysts, but they are stable in the high-temperature, reducing environment of the autothermal reformer. By using a mixture of stable and catalytically active elements on the B site of the perovskite, the perovskite structure is retained and there is good catalytic activity. In addition to using stable elements on the B-site which have the correct valence, the transition metal-containing perovskites can be stabilized by incorporating elements on the B-site which have higher valences. In reducing atmospheres, these higher valence elements stabilize the lower valence of the transition metals formed in reducing atmospheres. Elements like titanium, molybdenum, tungsten, vanadium, niobium, and the like can serve this purpose.

The preferred form of the present invention is directed to catalyst formulations containing Ru as the lower cost ingredient to replace Rh and Pt which therefore reduces the overall system cost. The active catalytic ingredient in the current invention is also imbedded inside of the perovskite framework to minimize the metal agglomeration and to retain the catalytic activity during reforming. This formation can be the catalyst of choice for the fuel reforming component in the fuel cell system for both transportation and stationary power generation applications. The catalyst embodiments disclosed are also good steam reforming catalysts which may be used in place of hydrogen generation in the current industrial practice, such as Kellogg process. These embodiments can be a good alternative for use with fuel cells to operate auxiliary equipment on diesel trucks and other stationary sources where diesel fuel is readily available.

One of the key aspects needed for moving toward a hydrogen economy is practical autothermal reformer catalysts for conversion of gasoline and diesel fuels to hydrogen rich reformate. Catalyst compounds such as mixed oxides of La with Cr or Al ($LaCrO_3$ or $LaAlO_3$), when doped with elements like Ni, have demonstrated improved stability in both air and hydrogen-rich gas at elevated temperatures. These catalysts, however, when tested on diesel fuels, produced low hydrogen yields and poor hydrocarbon conversions. It is believed that this was due to the higher temperatures required to reform diesel fuel. Prior work in this area has specifically avoided use of noble metals due to their higher cost, their tendency to agglomerate at high temperatures, and their tendency to lead to higher coke formation. Certain embodiments of the present invention can employ the addition of metals in small amounts as dopants to the perovskite structure. The perovskite structure is believed to lock these noble metals into the lattice structure, leading to unexpectedly superior stability and performance. The preferred embodiments of the invention replace the small fraction (10% to 30%) of the A-site(La) with strontium ion (Sr) and the small fraction (1% to 20%) of the B-site (Cr or Al) with ruthenium (Ru) or rhodium (Rh) metal ions and the like. These catalysts have demonstrated high selectivity of converting simulated diesel fuel to hydrogen at high fuel feed rates and excellent autothermal reforming efficiency under a wide range of oxygen-to-carbon and steamto-carbon ratios. They have also demonstrated high steam reforming efficiency and good catalytic stability at high operating temperatures, exhibiting very little tendency for coke formation.

The embodiments of present invention comprise a new group of catalysts for reforming, preferably diesel reforming. More specifically, ATR reforming efficiency is improved significantly by doping a small amount of Ru or Rh into chromite or aluminite type of perovskites. The catalysts of the present invention have demonstrated high selectivity of converting hydrocarbons like diesel to hydrogen and carbon oxides under high fuel feed rate and relatively low reforming temperature range of 600 to 700° C. In comparison with benchmark catalysts prepared with the existing techniques, the new catalysts also showed excellent ATR reforming efficiency under wide range of oxygen-to-carbon ratio ($O_2/C$) and steam-to-carbon ratio ($H_2O/C$), as well as superior steam reforming efficiency when air is absent from the feed. The catalysts also have demonstrated good stability of the catalytic activity under high operating temperature and exhibited little or no carbon formation on the catalyst surface.

The new catalysts are comprised of lanthanum chromite, $LaCrO3$ or lanthanum aluminite, $LaAlO3$ perovskite materials with both A-site (La) or B-site (Cr or Al) being completely exchanged or partially exchanged with other metal ions to form $La_{1-x}A_xCr_{1-y}B_yO_3$ or $La_{1-x}A_xAl_{1-y}B_yO_3$ respectively. For example, La can be partially or completely exchanged by A=Gd, Pr where x=about 0.1 to 1. Alternatively, La can also be partially exchanged by A=Sr where x=0.05 to 0.5. The preferred value for x is about 0.1 to 0.2 when A=Sr. Similarly, the Cr or Al can be partially exchanged by B=Ru, Rh where y=about 0.01 to 0.2. The preferred value for y is about 0.05 to 0.1.

There are several advantages of using A- and B-site substituted (or doped) chromite or aluminite as the catalysts for diesel reforming. For example, both Ru and Rh are known to be active in reforming hydrocarbons to $H_2$ rich reformate. However, they tend to agglomerate and vaporize at high reaction temperature in the conventional oxide supported catalysts as was mentioned previously, especially in the case of Ru which volatizes into gas phase in the form of ruthenium oxide. By doping Ru and Rh into perovskite, the metal ions are mono-atomically embedded into the oxide framework which is more stable to prevent migration of metal under the elevated temperature. While not being limited by theory, it is believed that the volatility and diffusion of Ru or Rh when anchored into the lanthanum chromite or lanthanum aluminite structure will be determined by metal-oxygen bond strength and not by metal-metal bonding. Being able to use Ru in ATR catalyst is especially attractive because of its relatively low cost compared with other precious metals. Another advantage of doping Ru and Rh in perovskite is to improve the synergistic effect between them and the transition metal during the catalytic reaction. Transition metal perovskite such as chromite, for example, is known for its catalytic oxidation activity. Incorporating catalytic metal with strong steam reforming activity such as Ru will improve the coupling of the active site and thermal management for both POX and SR reactions, hence increasing the overall reforming efficiency. Transition metal perovskite also provides a low acidity catalytic support which induces less coke formation during heavy hydrocarbon reforming. Through A-site and B-site substitution, metals with a high basic property, such as those in alkaline earth group and lanthanum group can be effectively incorporated inside of perovskite. Since Ru and Rh are imbedded inside of the perovskite framework in ionic form instead of metallic state in the conventional supported catalyst, the chance of poisoning through the adsorption of sulfur on the surface of the metal crystallite is therefore decreased.

The Ru and Rh doped chromite and aluminite catalysts used in this study were prepared through a well known glycine-nitrate self-combustion method. Briefly, the appropriate portion of the solution of metal nitrate salts and glycine is first mixed, followed by the vaporization of water above the boiling point. After the water is evaporated, the mixture starts to form foam which ignites spontaneously to form solid powder. The powder was further calcined at elevated temperature in dry air to remove residual water and organics and then the fines in the powder were converted into micro-crystallite. The calcined powder was further pelletized into the catalyst pellets and tested in an ATR diesel reforming micro-reactor. The micro-reactor used for this test consists of a preheater and reactor bed where the catalyst pellets are packed in a plug-flow configuration. The reactants for the reforming reaction include water, air, and diesel surrogate fuel which are preheated and mixed before entering the catalyst bed with the equivalent gas hourly space velocity in the range of 50,000 to 100,000 $hr^{-1}$. During the test, a varying ratio is used of the number of moles of oxygen in the feed over the number of mole of carbon in the fuel, $O_2/C$ and the ratio of the number of moles of water in the feed over the number of moles of carbon in the fuel, $H_2O/C$. The reactor is surrounded by a heater in which the temperature is set at a constant value during the experiment. The reformate effluent from the catalytic reaction is analyzed through the gas chromatography (GC). The moisture in the sample is first reduced by an ice trap followed by the filtration through a Drierite column. This arrangement allows the probing of not only the key reformate components ($H_2$, CO, $CO_2$, $CH_4$, $N_2$) but also light residual hydrocarbons ($C_2H_4$, $C_2H_6$, $C_3H_6$, $C_3H_8$, etc....) with high accuracy and without the interference of the steam. The mass flow of hydrogen thus analyzed will be used to calculate the hydrogen yield which is defined as the number of moles of $H_2$ produced per one mole of fuel in the input. Alternatively, the reforming efficiency can be calculated which equals the total heat of combustion for the $H_2$ and CO generated over the heat of combustion of the fuel input. To estimate the degree of fuel conversion, a COX selectivity is also calculated which is defined as moles of carbon oxide ($CO+CO_2$) formed over the mole of carbons in the fuel.

The current invention is directed to the use of perovskite and perovskite-like material as the catalyst for reforming hydrocarbons to hydrogen rich reformate. The perovskite and perovskite-like materials of preferred embodiments have the composition of:

$(A_{1-x}A_x')(B_{1-y}B_y')O_{3\pm e}$ [perovskite]; or $(A_{1-z}A_z'O)(A_{1-x}A_x'B_{1-y}B_y'O_{3\pm e})_n$ [Ruddlesden-Popper]

where A=La, Y, Pr, Gd;

A'=Na, K, Ca, Sr, Ba, Ag, Ce;

B=Ni, Co, Cu, Zn, Fe, Ga, Al, Cr, Mn, Ti, V, Mo, W, Zr, Nb, Sn;

B'=Ru, Rh; and x=0 to 1 y=0 to 0.5 z=0 to 0.5.

Various mixtures of the above are also within the scope of the present invention. In a preferred embodiment, the invention comprises the perovskite or Ruddlesden-Popper structure above, wherein:

A=La, Y, Pr, Gd;

A'=Ca, Sr, Ba, Ce;

B=Ni, Cu, Zn, Ga, Al, Cr, Ti, V, Mo, W, Zr, Nb, Sn;

B'=Ru, Rh; and further wherein:
x=0 to 0.5
y=0 to 0.2
z=0 to 0.2.
including mixtures thereof.

In another embodiment of the present invention, the catalyst preparation can include the introduction of precious metal nitrates to the glycine nitrate process.

The catalyst invention described above can be prepared by any known method, such as self-combustion, coprecipitation, sol-gel, or mechanically mixing oxides or precursors of oxides of the different elements, all of which may optionally be followed by calcinations. The catalyst may optionally undergo other processes, such as physical treatment, i.e., milling or chemical treatments, which increase the surface area of the catalyst. The catalyst or the precursors for the catalyst may be optionally formed by itself into any useful shape or configuration or applied to a substrate, which provides mechanical strength and/or thermal shock resistance and which has any useful shape or configuration, including but not limited to granules, pellets, tablets, extrudates, foams, or honeycomb-type monoliths. After synthesis or after shaping, the catalyst may optionally undergo a final thermal activation under low oxygen partial pressure.

The present invention also relates to a method of forming hydrogen-rich gas from hydrocarbon fuel by mixing the hydrocarbon with steam and air, or oxygen, and passing it over the catalyst embodiments described herein at temperatures between about 400° C. and about 900° C. for a time sufficient to generate the hydrogen rich gas. With an efficient catalyst, the only reaction products in the gas are hydrogen, carbon monoxide, carbon dioxide, and methane. The relative amounts of the three reactants control the reactor temperature, which in turn, will affect the relative amounts of the four products due to thermodynamic considerations. Higher temperatures will yield more hydrogen and carbon monoxide (which is desirable because it can be used in a downstream water-gas shift reactor to generate even more hydrogen), however, higher temperatures will undesirably increase fuel processor startup time. For an adiabatic reactor, higher temperature can only be achieved with higher oxygen-to-carbon ratio in the feed which tends to reduce the overall reforming efficiency.

In another embodiment any of the catalysts described herein, or the precursors for the catalysts, can be formed by itself into any useful shape or configuration or applied to a substrate, which provides mechanical strength and/or thermal shock resistance and which has any useful shape or configuration, including but not limited to granules, pellets, tablets, extrudates, foams, or honeycomb-type monoliths.

Another embodiment provides a process using any of the catalysts described above for the production of hydrogen-containing gas by the autothermal reforming of a mixture of steam, air or oxygen-containing gas, and hydrocarbon fuel, such as natural gas, gasoline, diesel, gas or liquid rich in alkanes, gas or liquid containing aromatics, and gas or liquid containing alkanes and branched alkanes, at temperatures between about 400° C. and about 900° C.

EXAMPLES

The following non-limiting examples illustrate autothermal reforming catalysts in accordance with the principles of the present invention. Table I summarizes the hydrogen yield, reforming efficiency, and selectivity to carbon oxides in autothermal reforming reaction for the catalysts of Examples 1-12.

TABLE I

Reforming Characteristics of Examples 1-11.

| | | $O_2/C = 0.50, H_2O/C = 3.0$ | | | $O_2/C = 0.42, H_2O/C = 1.0$ | | |
| --- | --- | --- | --- | --- | --- | --- | --- |
| | Catalyst Sample | $H_2$ yield (mol-$H_2$/mol-fuel) | Reforming Efficiency (%) | $CO_x$ Selectivity (%) | $H_2$ yield (mol-$H_2$/mol-fuel) | Reforming Efficiency (%) | $CO_x$ Selectivity (%) |
| Example 1 | $LaCr_{0.95}Ru_{0.05}O_3$ | 22.6 | 80.0 | 98.5 | 20.3 | 87.1 | 98.0 |
| Example 2 | Rh/CGO | 22.7 | 77.4 | 97.8 | 19.6 | 78.7 | 93.4 |
| Example 3 | $LaAl_{0.95}Ru_{0.05}O_3$ | 23.1 | 79.6 | 98.6 | 19.9 | 81.6 | 94.7 |
| Example 4 | $La_{0.8}Sr_{0.2}Cr_{0.95}Ru_{0.05}O_3$ | 22.0 | 79.8 | 96.9 | 20.2 | 83.5 | 94.7 |
| Example 5 | $La_{0.8}Sr_{0.2}Al_{0.95}Ru_{0.05}O_3$ | 21.1 | 73.6 | 96.9 | 18.7 | 79.6 | 94.1 |
| Example 6 | $La_{0.8}Sr_{0.2}CrO_3$ | 10.2 | 41.5 | 71.5 | 9.1 | 40.1 | 64.8 |
| Example 7 | $La_{0.8}Sr_{0.2}Cr_{0.9}Ni_{0.10}O_3$ | 9.0 | 35.6 | 71.7 | 9.2 | 38.5 | 67.8 |
| Example 8 | $La_{0.8}Sr_{0.2}Cr_{0.95}Rh_{0.05}O_3$ | 22.4 | 80.6 | 96.2 | 17.0 | 72.4 | 85.3 |
| Example 9 | $La_{0.9}Ce_{0.1}Cr_{0.95}Ru_{0.05}O_3$ | 19.8 | 70.1 | 94.2 | 17.5 | 73.8 | 90.1 |
| Example 10 | $Gd_{0.8}Sr_{0.2}Cr_{0.95}Ru_{0.05}O_3$ | 20.3 | 71.1 | 94.4 | 18.9 | 74.8 | 90.5 |
| Example 11 | $Pr_{0.8}Sr_{0.2}Cr_{0.95}Ru_{0.05}O_3$ | 21.5 | 70.7 | 92.8 | 18.7 | 72.5 | 88.7 |
| Example 12 | $Ru/\gamma-Al_2O_3$ | 11.4 | 38.2 | 62.3 | 7.3 | 22.4 | 39.9 |

Example 1

Figure 3B:
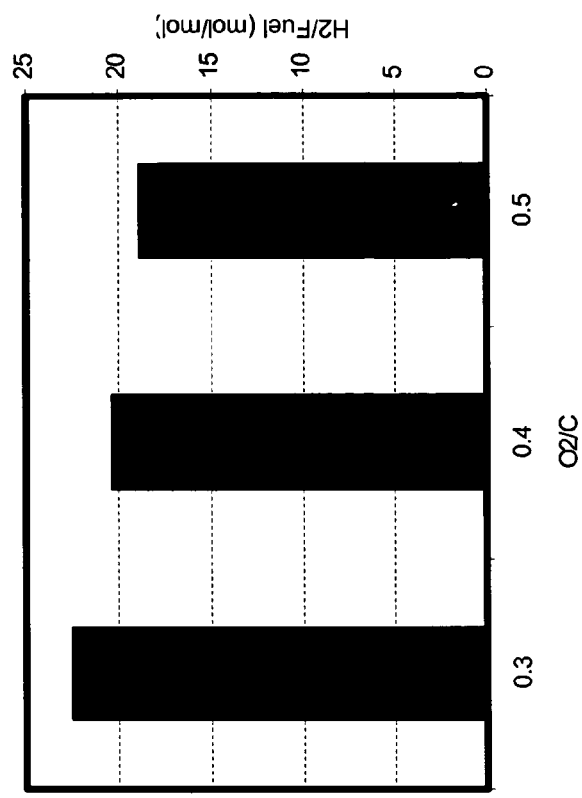
FIG. 3b illustrates a graph of hydrogen yield of dodecane during ATR reforming at different $O_2/C$ ratio ($H_2O/C=1$) over $LaCr_{0.95}Ru_{0.05}O_3$.
Figure 3A:
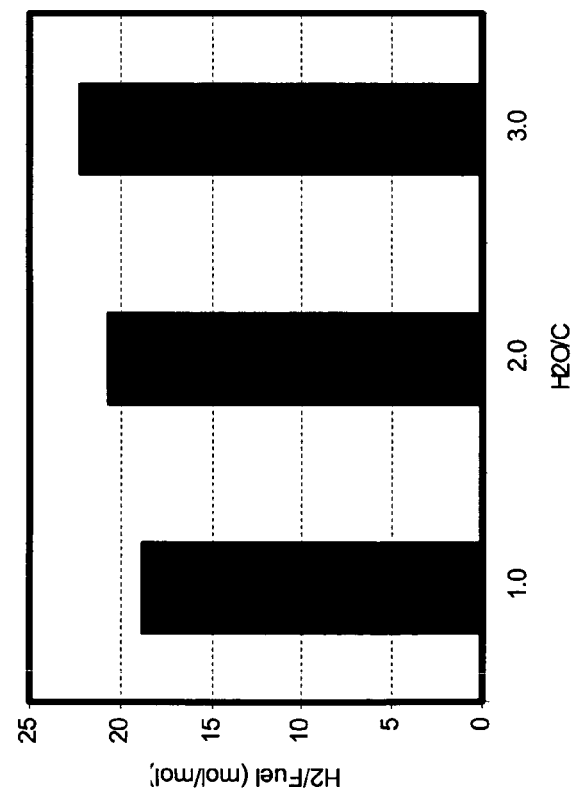
FIG. 3a illustrates a graph of hydrogen yield of dodecane during ATR reforming at different $H_2O/C$ ratio ($O_2/C=0.5$) over $LaCr_{0.95}Ru_{0.05}O_3$.
Figure 4B:
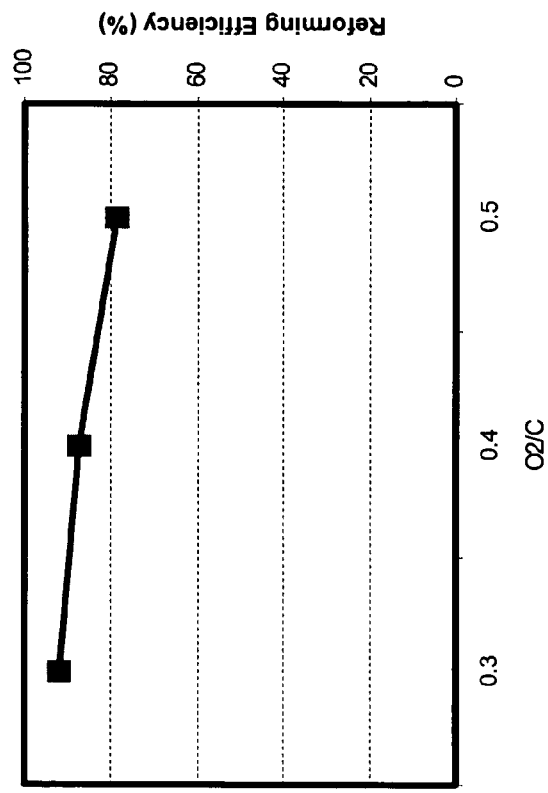
FIG. 4b illustrates a graph of reforming efficiency of dodecane during ATR reforming at different $O_2/C$ ratio ($H_2O/C=1$) over $LaCr_{0.95}Ru_{0.05}O_3$.
Figure 4:
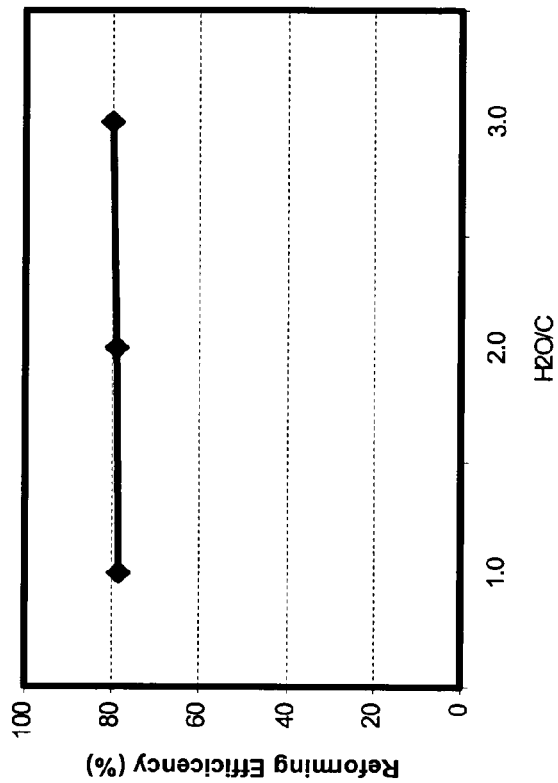
FIG. 4a illustrates a graph of reforming efficiency of dodecane during ATR reforming at different $H_2O/C$ ratio ($O_2/C=0.5$) over $LaCr_{0.95}Ru_{0.05}O_3$.

A $LaCr_{0.95}Ru_{0.05}O_3$ catalyst was made by fully dissolving 17.9 gram of $La(NO_3)_3.6H_2O$, 15.8 gram of $Cr(NO_3)_3.9H_2O$, 0.66 gram of $Ru(NO)(NO_3)_3$ and 12 gram of glycine with the deionized water in a high temperature quartz beaker. After evaporating the water over a hot-plate, the mixture ignited and generated about 10 gram of $LaCr_{0.95}Ru_{0.05}O_3$ powder. The powder was placed in a ceramic dish and calcined at 800° C. in dry air for about 1 hour. Subsequently, the powder was pressed and palletized to 20/40 mesh size catalyst pellet. About 0.9 gram of the catalyst sample thus prepared was packed into the reactor zone of the diesel reforming microreactor. To ensure uniform packing depth and density, the catalyst was first mixed with low surface α-alumina ceramic chips before being loaded into the reactor. During the catalytic reaction, the surrounding heater for the catalyst bed was set at 725° C. The mixture of air, steam and fuel was fed through the preheater at the constant feed rate of $2.75 \times 10^{-3}$ g-fuel/g-catalyst·sec. High purity dodecane (>98%) was used as the surrogate fuel for the study. The hydrogen rich reformate generated from the reactor was analyzed by a gas chromatography detector. All key reformate components ($H_2$, CO, $CO_2$, $CH_4$, $N_2$) and residual hydrocarbons ($C_2H_4$, $C_2H_6$, $C_3H_6$, $C_3H_8$, etc. . . . ) were analyzed and calculated. Shown in FIGS. 3a and 3b are the hydrogen yields obtained through the ATR reaction with different oxygen-to-carbon ratio, $O_2/C$, and steam-to-carbon ratio, $H_2O/C$ in the input mixture. Shown in FIGS. 4a and 4b are the corresponding reforming efficiencies which count up both $H_2$ and CO as fuel for solid oxide fuel cells. The hydrogen yield and reforming efficiency at two input condition $O_2/C=0.42$ $H_2O/C=1.0$ and $O_2/C=0.5$ $H_2O/C=3.0$ are also listed in Table I, together with the $CO_x$ selectivities under the corresponding reforming reaction conditions.

Example 2

A Rh catalyst support on the cerium oxide and gadolinium oxide (Rh/CGO) was made by titrating the solution of Rh nitrate over the cerium oxide and gadolinium oxide (CGO) powder, followed by the calcination in dry air at 700° C. CGO was obtained as the commercial product from Praxair. The Rh nitrate solution was prepared by dissolving appropriate amount of salt into the deionized water so that the final Rh loading on the catalyst is about 0.5 wt. %. The catalyst powder was subsequently pelletized and tested under ATR condition similar to that discussed in Example 1. To compare the catalytic activity, the hydrogen yield and reforming efficiency at two input condition $O_2/C=0.42$ $H_2O/C=1.0$ and $O_2/C=0.5$ $H_2O/C=3.0$ are also listed in Table I, together with the $CO_x$ selectivity of the reforming reaction. This example is used as the reference for the comparison with the perovskite catalysts.

Example 3

Figure 5:
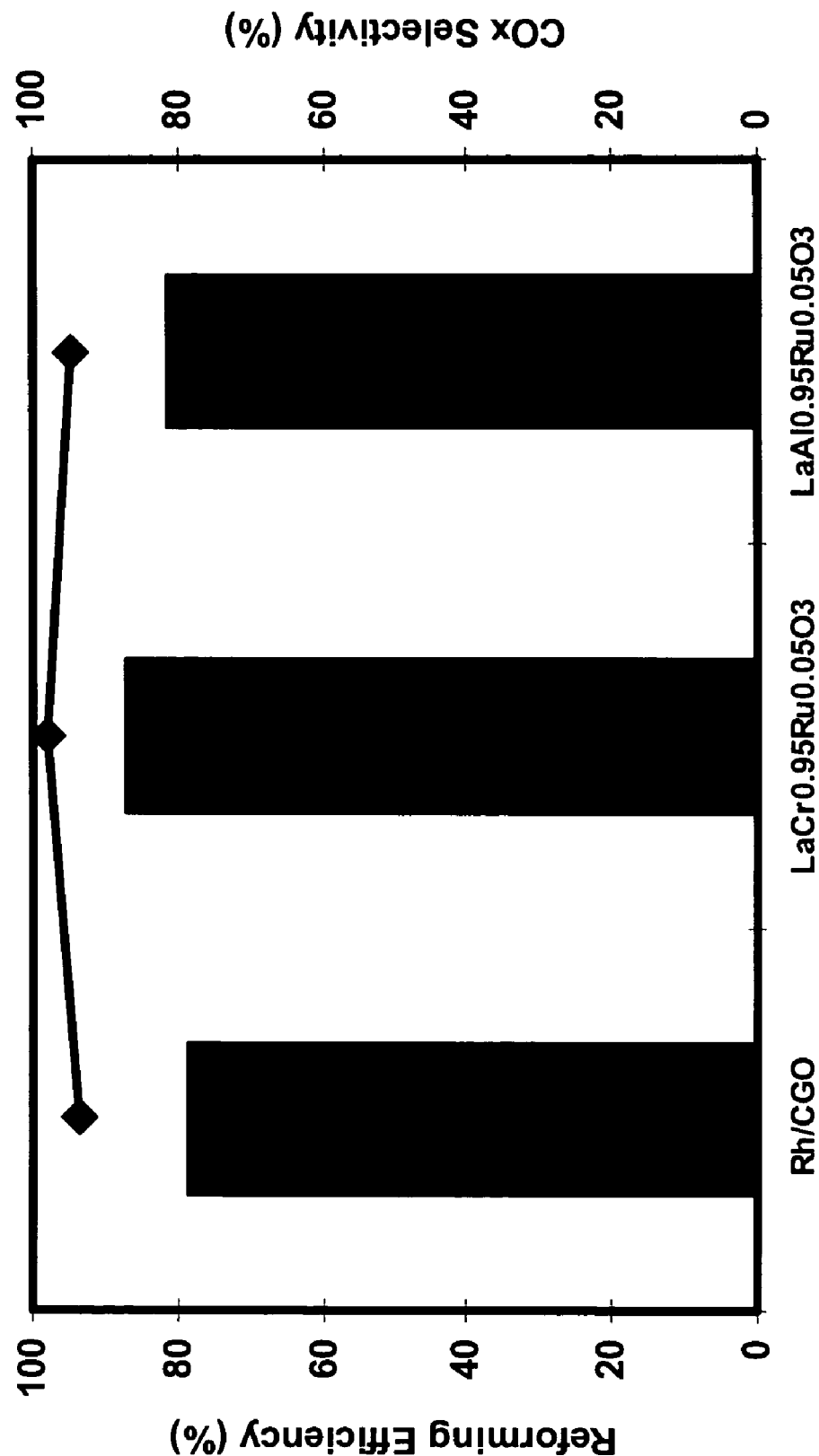
FIG. 5 shows the comparison of hydrogen yield (bar) and the COx selectivity, obtained at $O_2/C=0.42$ and $H_2O/C=1.1$, of the catalysts $LaCr_{0.95}Ru_{0.05}O_3$ and $LaAl_{0.95}Ru_{0.05}O_3$ from the current invention with the Rh supported by ceria and gadolinia (Rh/CGO) from the prior art.
Figure 6:
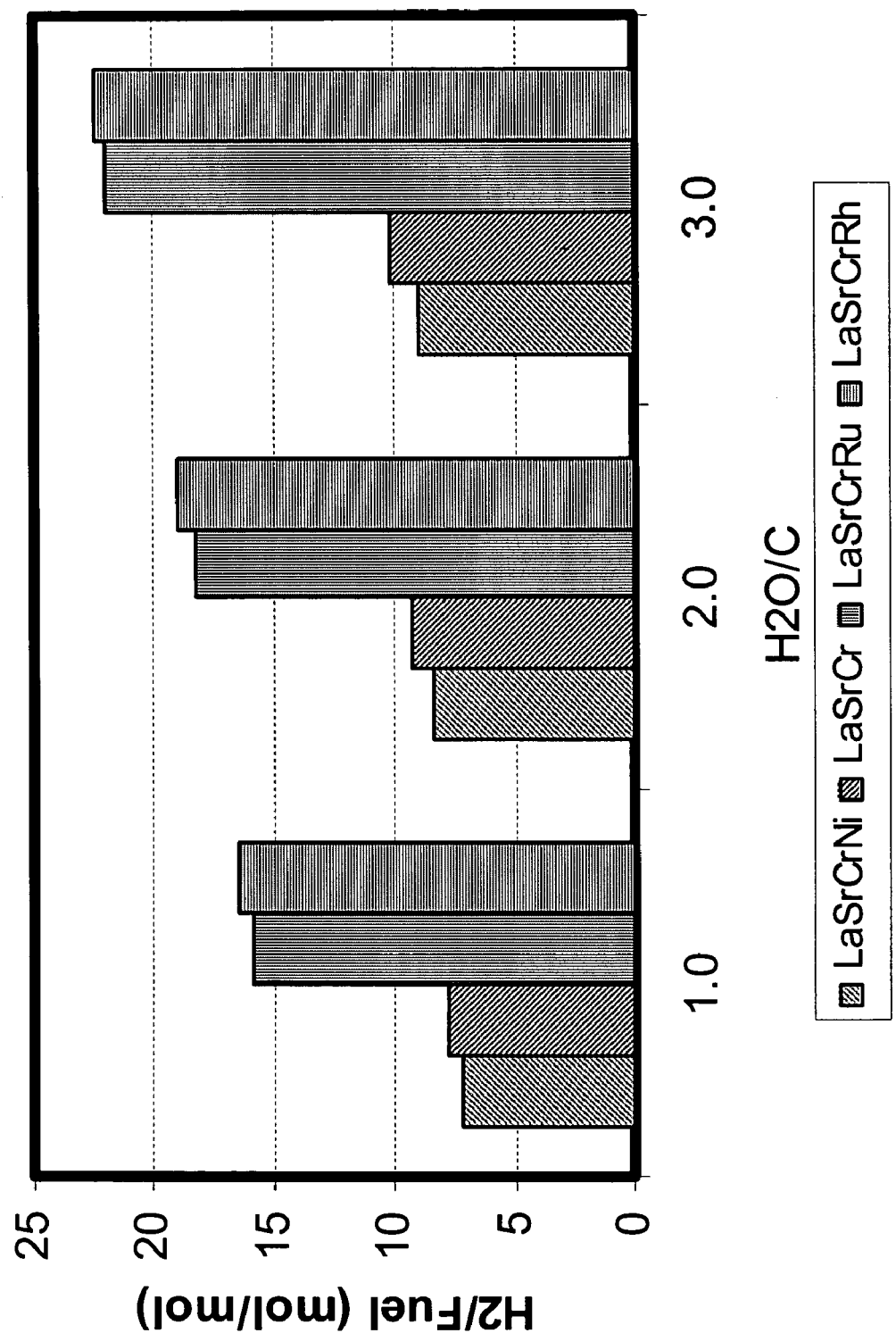
FIG. 6 shows the comparison of hydrogen yield at various $H_2O/C$ ($O_2/C=0.5$) of the catalysts $La_{0.8}Sr_{0.2}Cr_{0.95}Ru_{0.05}O_3$ (LaSrCrRu) and $La_{0.8}Sr_{0.2}Cr_{0.95}Rh_{0.05}O_3$ (LaSrCrRh)

A $LaAl_{0.95}Ru_{0.05}O_3$ catalyst was made by fully dissolving 19.9 gram of $La(NO_3)_3.6H_2O$, 16.4 gram of $Al(NO_3)_3.9H_2O$, 15.7 gram of diluted $Ru(NO)(NO_3)_3$ solution with Ru content of 1.53 wt. % and 14 gram of glycine with the deionized water in a high temperature quartz beaker. After evaporating the water over a hot-plate, the mixture ignited and generated about 10 gram of $LaAl_{0.95}Ru_{0.05}O_3$ powder. The powder was placed in a ceramic dish and calcined at 800° C. in dry air for about 1 hour. The catalyst powder was subsequently pelletized and tested according to the same steps in Example 1. The hydrogen yield and reforming efficiency at two input condition $O_2/C=0.42$ $H_2O/C=1.0$ and $O_2/C=0.5$ $H_2O/C=3.0$ are also listed in Table I, together with the $CO_x$ selectivity of the reforming reaction. Shown in FIG. 5 are the comparison of the reforming efficiencies (bar chart) and $CO_x$ selectivities (line chart) between the catalyst materials from Example 1 and Example 3 according to present invention with the reference catalyst from Example 2.

Example 4

A $La_{0.8}Sr_{0.2}Cr_{0.95}Ru_{0.05}O_3$ catalyst was made by fully dissolving 15.0 gram of $La(NO_3)_3.6H_2O$, 1.83 gram of $Sr(NO_3)_2$, 16.4 gram of $Cr(NO_3)_3.9H_2O$, 0.68 gram of $Ru(NO)(NO_3)_3$ and 12 gram of glycine with the deionized water in a high temperature quartz beaker. After evaporating the water over a hot-plate, the mixture ignited and generated about 10 gram of $La_{0.8}Sr_{0.2}Cr_{0.95}Ru_{0.05}O_3$ powder. The powder was placed in a ceramic dish and calcined at 800° C. in dry air for about 1 hour. The catalyst powder was subsequently pelletized and tested according to the same steps in Example 1. The hydrogen yield and reforming efficiency at two input condition $O_2/C=0.42$ $H_2O/C=1.0$ and $O_2/C=0.5$ $H_2O/C=3.0$ are also listed in Table I, together with the $CO_x$ selectivity of the reforming reaction.

Example 5

A $La_{0.8}Sr_{0.2}Al_{0.95}Ru_{0.05}O_3$ catalyst was made by fully dissolving 16.7 gram of $La(NO_3)_3.6H_2O$, 2.04 gram of $Sr(NO_3)_2$, 17.2 gram of $Al(NO_3)_3.9H_2O$, 15.9 gram of diluted $Ru(NO)(NO_3)_3$ solution with Ru content of 1.53 wt. % and 14 gram of glycine with the deionized water in a high temperature quartz beaker. After evaporating the water over a hot-plate, the mixture ignited and generated about 10 gram of $La_{0.8}Sr_{0.2}Al_{0.95}Ru_{0.05}O_3$ powder. The powder was placed in a ceramic dish and calcined at 800° C. in dry air for about 1 hour. The catalyst powder was subsequently pelletized and tested according to the same steps in Example 1. The hydrogen yield and reforming efficiency at two input condition $O_2/C=0.42$ $H_2O/C=1.0$ and $O_2/C=0.5$ $H_2O/C=3.0$ are also listed in Table I, together with the $CO_x$ selectivity of the reforming reaction.

Example 6

A $La_{0.8}Sr_{0.2}CrO_3$ catalyst was made by fully dissolving 15.5 gram of $La(NO_3)_3.6H_2O$, 1.85 gram of $Sr(NO_3)_2$, 17.5 gram of $Cr(NO_3)_3.9H_2O$ and 12 gram of glycine with the deionized water in a high temperature quartz beaker. After evaporating the water over a hot-plate, the mixture ignited and generated about 10 gram of $La_{0.8}Sr_{0.2}CrO_3$ powder. The powder was placed in a ceramic dish and calcined at 800° C. in dry air for about 1 hour. The catalyst powder was subsequently pelletized and tested according to the same steps in Example 1. The hydrogen yield and reforming efficiency at two input condition $O_2/C=0.42$ $H_2O/C=1.0$ and $O_2/C=0.5$ $H_2O/C=3.0$ are also listed in Table I, together with the $CO_x$ selectivity of the reforming reaction. This example is used as the reference for the comparison with the perovskite catalysts containing Ru and Rh Example 7

A $La_{0.8}Sr_{0.2}Cr_{0.9}Ni_{0.1}O_3$ catalyst was made by fully dissolving 15.1 gram of $La(NO_3)_3.6H_2O$, 1.85 gram of $Sr(NO_3)_2$, 15.7 gram of $Cr(NO_3)_3.9H_2O$, 1.27 gram of $Ni(NO_3)_2.6H_2O$ and 16 gram of glycine with the deionized water in a high temperature quartz beaker. After evaporating the water over a hot-plate, the mixture ignited and generated about 10 gram of $La_{0.8}Sr_{0.2}Cr_{0.9}Ni_{0.1}O_3$ powder. The powder was placed in a ceramic dish and calcined at 800° C. in dry air for about 1 hour. The catalyst powder was subsequently pelletized and tested according to the same steps in Example 1. The hydrogen yield and reforming efficiency at two input condition $O_2/C=0.42$ $H_2O/C=1.0$ and $O_2/C=0.5$ $H_2O/C=3.0$ are also listed in Table I, together with the $CO_x$ selectivity of the reforming reaction. This example is used as another reference for the comparison with the perovskite catalysts containing Ru and Rh Example 8

A $La_{0.8}Sr_{0.2}Cr_{0.95}Rh_{0.05}O_3$ catalyst was made by fully dissolving 15.0 gram of $La(NO_3)_3.6H_2O$, 1.83 gram of Sr(NO$_3$)$_2$, 16.4 gram of Cr(NO$_3$)$_3$.9H$_2$O, 0.70 gram of Rh(NO$_3$)$_3$.2H$_2$O and 12 gram of glycine with the deionized water in a high temperature quartz beaker. After evaporating the water over a hot-plate, the mixture ignited and generated about 10 gram of La$_{0.8}$Sr$_{0.2}$Cr$_{0.95}$Rh$_{0.05}$O$_3$ powder. The powder was placed in a ceramic dish and calcined at 800° C. in dry air for about 1 hour. The catalyst powder was subsequently pelletized and tested according to the same steps in Example 1. The hydrogen yield and reforming efficiency at two input condition O$_2$/C=0.42 H$_2$O/C=1.0 and O$_2$/C=0.5 H$_2$O/C=3.0 are also listed in Table I, together with the CO$_x$ selectivity of the reforming reaction. Shown in FIGS. 5, 6, 7 and 8 are the comparisons of hydrogen yield, reforming efficiency, and COx selectivity between the perovskite materials in Examples 4 and 8 according to the present invention with the reference materials in Example 6 and 7 taken from the prior art.

Example 9

A La$_{0.9}$Ce$_{0.1}$Cr$_{0.95}$Ru$_{0.05}$O$_3$ catalyst was made by fully dissolving 16.1 gram of La(NO$_3$)$_3$.6H$_2$O, 1.80 gram of Ce(NO$_3$)$_3$.6H$_2$O, 15.7 gram of Cr(NO$_3$)$_3$.9H$_2$O, 0.66 gram of Ru(NO)(NO$_3$)$_3$ and 12 gram of glycine with the deionized water in a high temperature quartz beaker. After evaporating the water over a hot-plate, the mixture ignited and generated about 10 gram of La$_{0.9}$Ce$_{0.1}$Cr0.95Ru0.05O3 powder. The powder was placed in a ceramic dish and calcined at 800° C. in dry air for about 1 hour. The catalyst powder was subsequently pelletized and tested according to the same steps in Example 1. The hydrogen yield and reforming efficiency at two input condition O$_2$/C=0.42 H$_2$O/C=1.0 and O$_2$/C=0.5 H$_2$O/C=3.0 are also listed in Table I, together with the CO$_x$ selectivity of the reforming reaction.

Example 10

A Gd$_{0.8}$Sr$_{0.2}$Cr$_{0.95}$Ru$_{0.05}$O$_3$ catalyst was made by fully dissolving 14.7 gram of Gd(NO$_3$)$_3$.6H$_2$O, 1.72 gram of Sr(NO$_3$)$_2$, 15.5 gram of Cr(NO$_3$)$_3$.9H$_2$O, 0.64 gram of Ru(NO)(NO$_3$)$_3$ and 12 gram of glycine with the deionized water in a high temperature quartz beaker. After evaporating the water over a hot-plate, the mixture ignited and generated about 10 gram of Gd$_{0.8}$Sr$_{0.1}$Cr$_{0.95}$Ru$_{0.05}$O$_3$ powder. The powder was placed in a ceramic dish and calcined at 800° C. in dry air for about 1 hour. The catalyst powder was subsequently pelletized and tested according to the same steps in Example 1. The hydrogen yield and reforming efficiency at two input condition O$_2$/C=0.42 H$_2$O/C=1.0 and O$_2$/C=0.5 H$_2$O/C=3.0 are also listed in Table I, together with the CO$_x$ selectivity of the reforming reaction.

Example 11

A Pr$_{0.8}$Sr$_{0.2}$Cr$_{0.95}$Ru$_{0.05}$O$_3$ catalyst was made by fully dissolving 15.0 gram of Pr(NO$_3$)$_3$.6H$_2$O, 1.82 gram of Sr(NO$_3$)$_2$, 16.3 gram of Cr(NO$_3$)$_3$.9H$_2$O, 0.68 gram of Ru(NO)(NO$_3$)$_3$ and 12 gram of glycine with the deionized water in a high temperature quartz beaker. After evaporating the water over a hot-plate, the mixture ignited and generated about 10 gram of Pr$_{0.8}$Sr$_{0.2}$Cr$_{0.95}$Ru$_{0.05}$O$_3$ powder. The powder was placed in a ceramic dish and calcined at 800° C. in dry air for about 1 hour. The catalyst powder was subsequently pelletized and tested according to the same steps in Example 1. The hydrogen yield and reforming efficiency at two input condition O$_2$/C=0.42 H$_2$O/C=1.0 and O$_2$/C=0.5 H$_2$O/C=3.0 are also listed in Table I, together with the CO$_x$ selectivity of the reforming reaction.

Example 12

A Ru catalyst support on gamma alumina (Ru/γ-Al$_2$O$_3$, with the γ-Al$_2$O$_3$ surface area of ~185 m$^2$/g and pellet size of 20/40 mesh) was made by titrating a solution of Ru nitrosyl nitrate solution over γ-Al$_2$O$_3$ pellet, followed by the high temperature reduction in hydrogen at 500° C. for one hour. The Ru nitrosyl nitrate solution was obtained from Aldrich Chemical containing 1.53 wt. % Ru. Appropriate amount of the solution was used so that the final Ru loading on the catalyst is about 4.0 wt. %. The catalyst powder was subsequently tested under ATR condition similar to that discussed in Example 1. To compare the catalytic activity, the hydrogen yield and reforming efficiency at two input condition O$_2$/C=0.42 H$_2$O/C=1.0 and O$_2$/C=0.5 H$_2$O/C=3.0 are also listed in Table I, together with the CO$_x$ selectivity of the reforming reaction. This example is used as the reference for the comparison with the perovskite catalysts.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," "more than" and the like include the number recited and refer to ranges which can be subsequently broken down into subranges as discussed above. In the same manner, all ratios disclosed herein also include all subratios falling within the broader ratio.

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

While preferred embodiments have been illustrated and described, it should be understood that changes and modifications can be made therein in accordance with ordinary skill in the art without departing from the invention in its broader aspects as defined in the specification.

The invention claimed is:

1. A catalyst composition comprising:
   a perovskite structure having the formula selected from the group consisting of PrCr$_{0.95}$Ru$_{0.05}$O$_3$, GdCr$_{0.95}$Ru$_{0.05}$O$_3$, LaAl$_{0.95}$Ru$_{0.05}$O$_3$, and LaCr$_{0.95}$Ru$_{0.05}$O$_3$.

2. The catalyst comprising:
   La$_{1-x}$A'$_x$Cr$_{1-y}$B$_y$O$_3$
   wherein A' is Ca,
   B is selected from the group consisting of Ru, Rh, and mixture thereof;
   x is about 0.05 to about 1; and
   y is about 0.01 to about 0.2.

3. The catalyst of claim 2, wherein x is about 0.1 to about 0.2.

4. The catalyst of claim 2, wherein y is about 0.05.

* * * * *

UNITED STATES PATENT AND TRADEMARK OFFICE
CERTIFICATE OF CORRECTION

PATENT NO. : 7,507,690 B2 Page 1 of 1
APPLICATION NO. : 10/832753
DATED : March 24, 2009
INVENTOR(S) : Michael Krumpelt and Di-Jai Liu It is certified that error appears in the above-identified patent and that said Letters Patent is hereby corrected as shown below:

ON FIRST PAGE OF PATENT:

Under ABSTRACT, line 9: Delete "firs" and replace with --first--.

Signed and Sealed this

Nineteenth Day of May, 2009

JOHN DOLL
*Acting Director of the United States Patent and Trademark Office*